United States Patent
Wong et al.

(10) Patent No.: US 9,844,885 B2
(45) Date of Patent: Dec. 19, 2017

(54) GRIPPING DEVICE HAVING OPENED AND CLOSED GRIPPING MODES

(71) Applicant: Tamkang University, New Taipei (TW)

(72) Inventors: Ching-Chang Wong, New Taipei (TW); Chia-Jun Yu, New Taipei (TW); Young-Sheng Lee, New Taipei (TW); Han-Sheng Chang, New Taipei (TW); Chih-Cheng Liu, New Taipei (TW)

(73) Assignee: Tamkang University, New Taipei (TW)

( * ) Notice: Subject to any disclaimer, the term of this patent is extended or adjusted under 35 U.S.C. 154(b) by 199 days.

(21) Appl. No.: 14/953,181

(22) Filed: Nov. 27, 2015

(65) Prior Publication Data

US 2017/0151679 A1    Jun. 1, 2017

(51) Int. Cl.
  *B66C 1/42* (2006.01)
  *B25J 15/10* (2006.01)
  *B25J 15/00* (2006.01)

(52) U.S. Cl.
  CPC .......... *B25J 15/10* (2013.01); *B25J 15/0028* (2013.01)

(58) Field of Classification Search
  CPC ...... B25J 15/10; B25J 15/0028; B25J 15/103; B25J 15/0009; B25J 9/1694; B25J 13/08; B25J 9/102; B25J 19/02; B25J 13/081; Y10S 901/39; Y10S 901/38
  USPC ........................ 294/106, 907; 901/39, 38, 46
  See application file for complete search history.

(56) References Cited

U.S. PATENT DOCUMENTS

| | | | | |
|---|---|---|---|---|
| 4,623,183 A * | 11/1986 | Aomori | ................... | B25J 15/103 294/106 |
| 4,957,320 A * | 9/1990 | Ulrich | ...................... | B25J 9/102 192/56.1 |
| 5,054,831 A * | 10/1991 | Ting | ..................... | A01C 11/025 111/101 |
| 5,501,498 A * | 3/1996 | Ulrich | ...................... | B25J 9/102 294/106 |
| 6,203,084 B1 * | 3/2001 | Kruk | ........................ | B65H 5/14 294/104 |
| 7,168,748 B2 * | 1/2007 | Townsend | .............. | B25J 9/1612 294/106 |
| 7,445,260 B2 * | 11/2008 | Nihei | ..................... | B25J 9/1612 294/106 |
| 7,551,978 B2 * | 6/2009 | Yokoyama | ............. | B25J 9/1612 414/225.01 |
| 8,195,334 B2 * | 6/2012 | Fukushima | ............ | B25J 13/085 700/245 |
| 8,585,111 B2 * | 11/2013 | Nammoto | ................ | B25J 15/10 294/106 |
| 8,801,063 B2 * | 8/2014 | Nammoto | ................ | B25J 15/10 294/106 |

(Continued)

*Primary Examiner* — Gabriela Puig
(74) *Attorney, Agent, or Firm* — Muncy, Geissler, Olds & Lowe, P.C.

(57) ABSTRACT

A gripping device comprises a base, a first finger rotatably or movably connected to the base, and a second finger connected to the base. The first finger and the second finger are capable of selectively entering an opened gripping mode and a closed gripping mode to grip an object. In the opened gripping mode, the first and second fingers grip the object from the same side of the object. In the closed gripping mode, the first and second fingers grip the object from different sides of the object.

19 Claims, 11 Drawing Sheets

(56) References Cited

U.S. PATENT DOCUMENTS

| | | | | |
|---|---|---|---|---|
| 8,991,884 B2* | 3/2015 | DeLouis | B25J 15/0009 | |
| | | | 294/106 | |
| 9,016,742 B2* | 4/2015 | Nammoto | B25J 13/082 | |
| | | | 294/106 | |
| 9,020,644 B2* | 4/2015 | Greeley | B25J 3/04 | |
| | | | 700/245 | |
| 9,138,897 B1* | 9/2015 | Salisbury | B25J 15/0009 | |
| 9,333,649 B1* | 5/2016 | Bradski | B25J 9/163 | |
| 9,539,728 B2* | 1/2017 | Nammoto | B25J 15/0009 | |
| 2001/0028174 A1* | 10/2001 | Matsuda | B25J 15/08 | |
| | | | 294/106 | |
| 2011/0166705 A1* | 7/2011 | Anderson | A01D 34/008 | |
| | | | 700/253 | |
| 2012/0116572 A1* | 5/2012 | Corak | B07C 5/36 | |
| | | | 700/223 | |
| 2013/0006423 A1* | 1/2013 | Ito | B25J 9/1612 | |
| | | | 700/259 | |
| 2013/0183129 A1* | 7/2013 | Nammoto | B25J 15/10 | |
| | | | 414/729 | |
| 2014/0007730 A1* | 1/2014 | DeLouis | B25J 15/0009 | |
| | | | 74/490.03 | |
| 2014/0103673 A1* | 4/2014 | Nammoto | B25J 13/082 | |
| | | | 294/106 | |
| 2014/0103676 A1* | 4/2014 | Nammoto | B25J 18/02 | |
| | | | 294/213 | |
| 2016/0042151 A1* | 2/2016 | Akdogan | B25J 9/1697 | |
| | | | 700/240 | |

* cited by examiner

GRIPPING DEVICE HAVING OPENED AND CLOSED GRIPPING MODES

BACKGROUND OF THE INVENTION

Field of the Invention

The invention relates in general to a gripping device, and more particularly to a gripping device having opened and closed gripping modes or a gripping device having switchable gripping modes.

Description of Related Art

The most common tool used on a manipulator mounted on a robot is a gripper, which allows the robot to grasp and move an object to fulfill the operational requirement. However, no single gripper design is optimal for all tasks, and this is a problem for grippers on robots, since their tasks are changed frequently.

The conventional gripper has two fingers, which can be closed and opened relative to each other to grip and release the object. When another object, which has a different shape or size, is disposed around near a wall, the gripper cannot grip the object any more. Thus, another gripper has to be used to grip the object by way of gripping or suction, or the object has to be moved to another place. Thus, it is time-consuming and cost-consuming to solve this problem.

SUMMARY OF THE INVENTION

It is therefore an object of the invention to provide a gripping device having opened and closed gripping modes to grip objects having different sizes or located at different environments so that the needs of the diversified tasks can be satisfied.

To achieve the above-identified object, the invention provides a gripping device comprising a base, a first finger rotatably or movably connected to the base, and a second finger connected to the base. The first finger and the second finger are capable of selectively entering an opened gripping mode and a closed gripping mode to grip an object. In the opened gripping mode, the first and second fingers grip the object from a same side of the object. In the closed gripping mode, the first and second fingers grip the object from different sides of the object.

The gripping device may further comprise a third finger connected to the base, wherein the first to third fingers are capable of selectively entering the opened gripping mode and the closed gripping mode to grip the object.

The gripping device may further comprise a control module, which is electrically connected to a first driving module of the gripping device; and a sensing module, which is electrically connected to the control module and senses a gripping failure of the object to output a sensing signal to the control module. The sensing module may sense a size of the object to output a sensing signal to the control module. The sensing module may sense an obstructer around the object to output a sensing signal to the control module. The control module controls the first driving module to move the first finger according to the sensing signal, so that the first and second fingers are switched from the closed gripping mode to the opened gripping mode, or switched from the opened gripping mode to the closed gripping mode.

With the embodiments of the invention, the gripping device can have the opened and closed gripping modes to grip objects having different sizes or located at different environments. In addition, the gripping device with the sensing module and the control module can automatically determine to switch to the opened or closed gripping mode. Thus, an intelligent gripping device for the robot arm can be provided to satisfy the needs of the diversified tasks.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
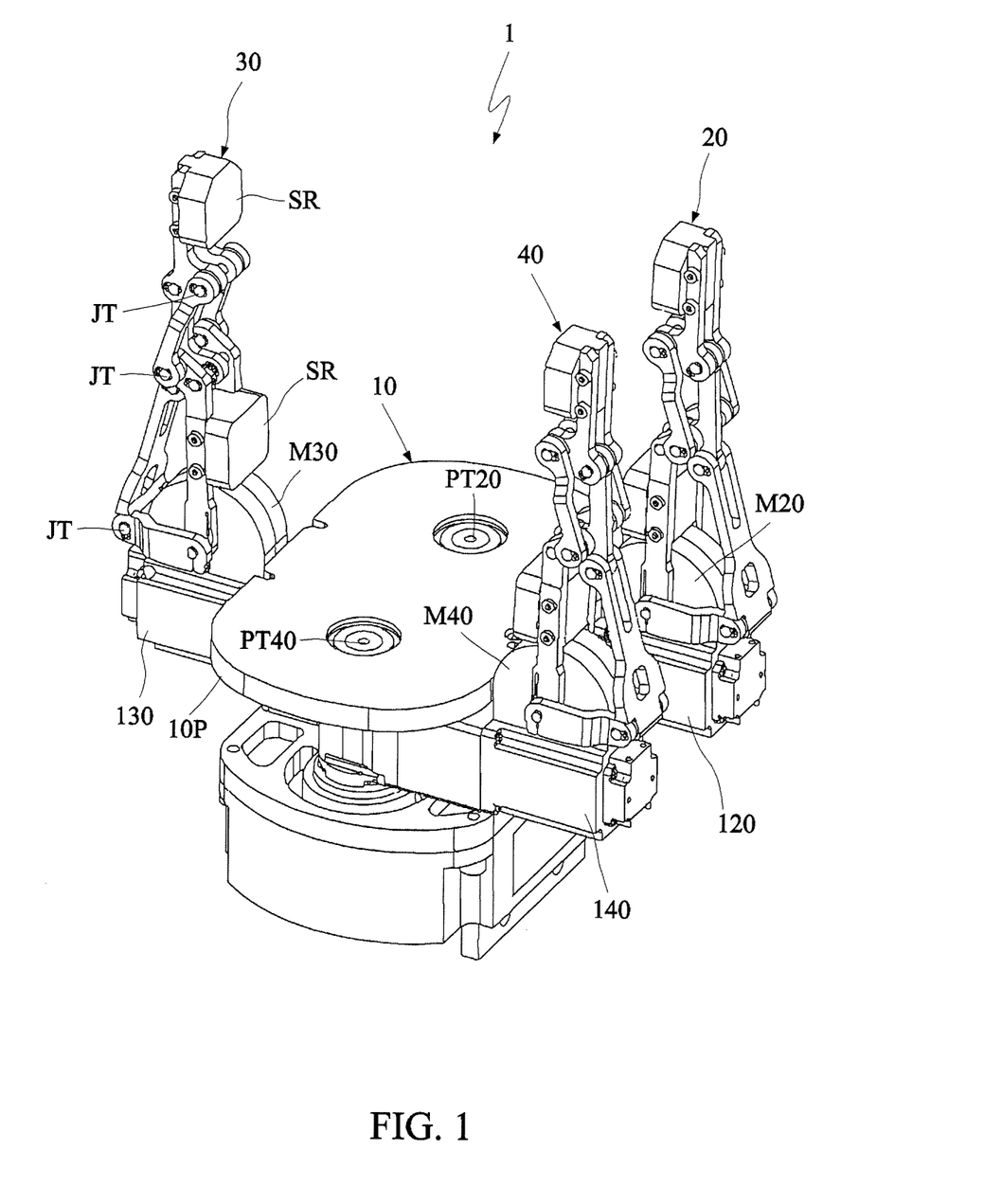
FIGS. 1 to 3 are a pictorial view, a front view and a top view showing a gripping device in a closed gripping mode according to a first embodiment of the invention.
Figure 2:
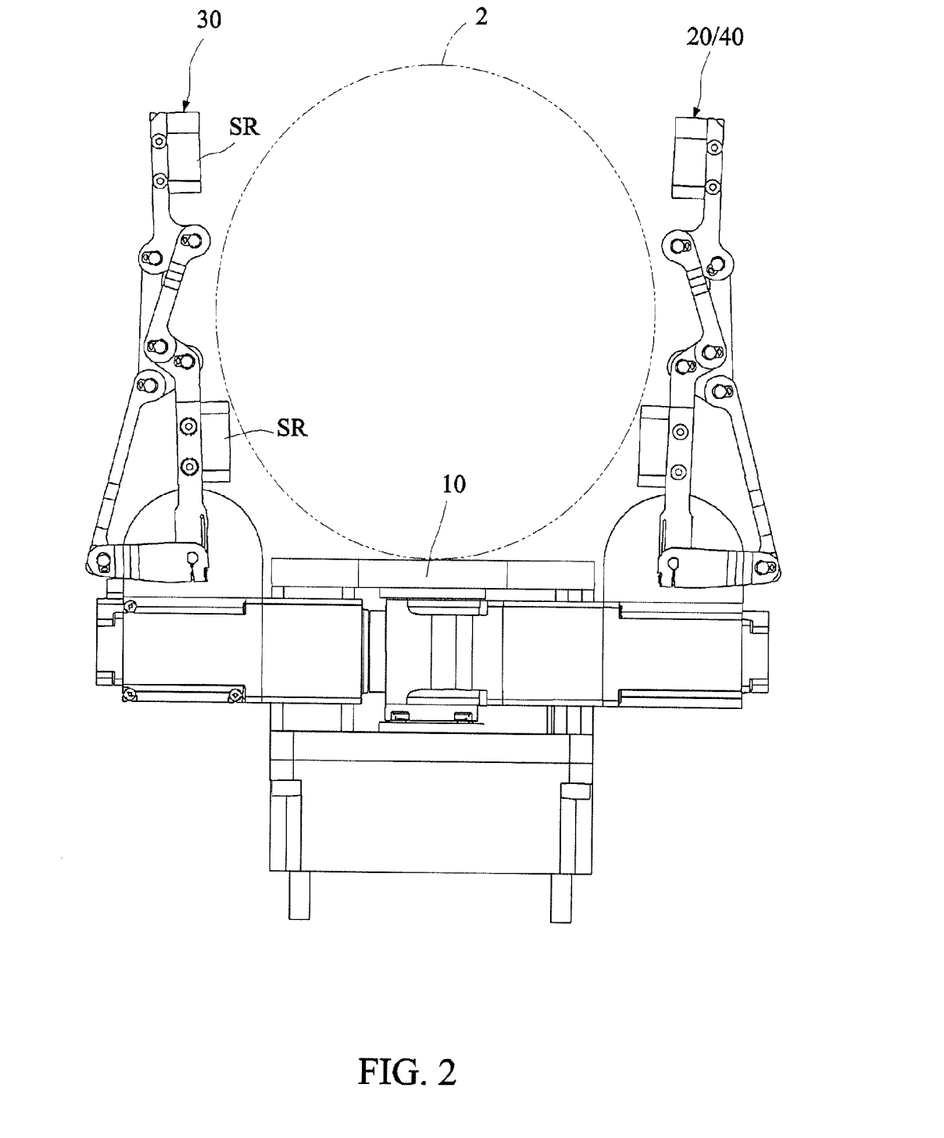
Figure 3:
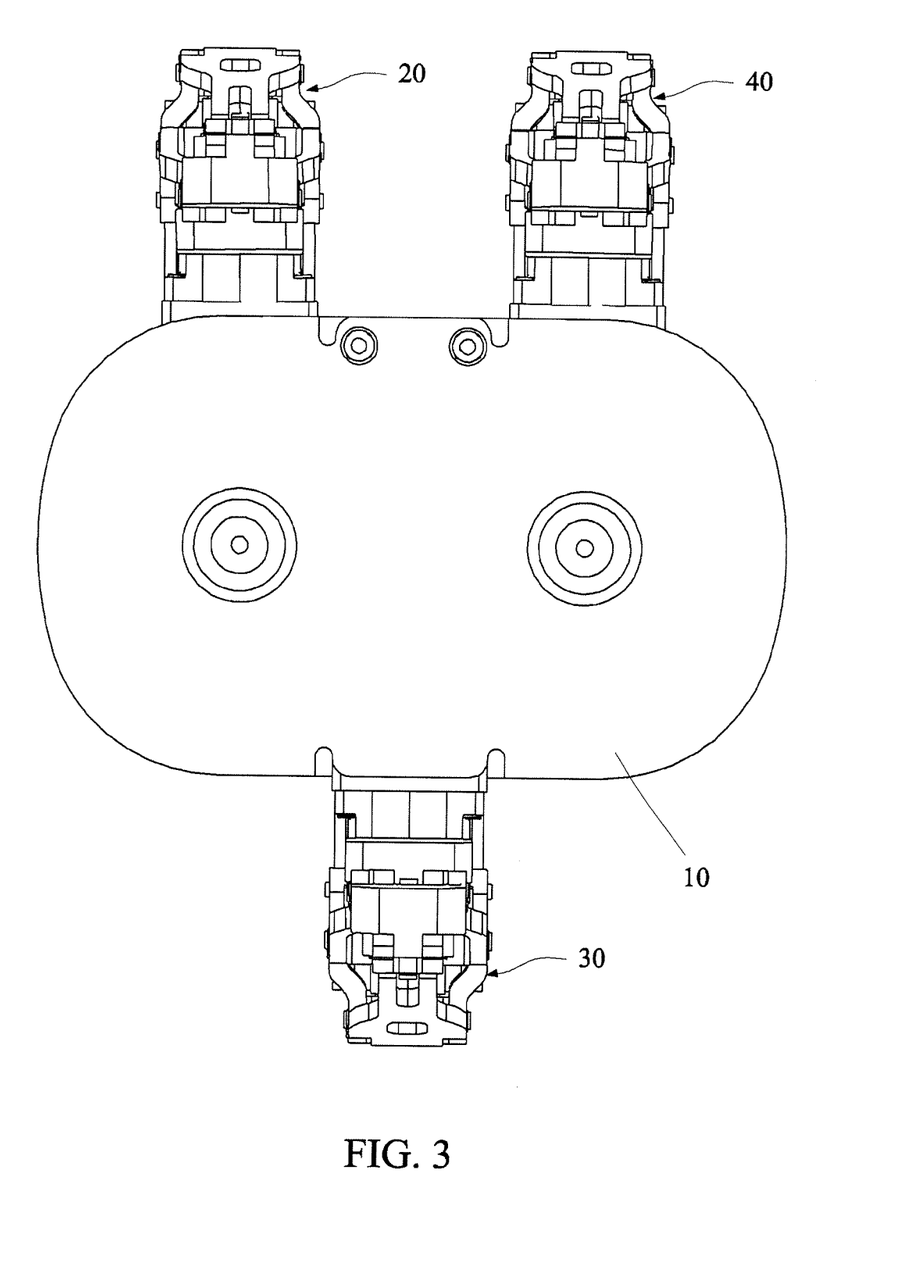
Figure 4:
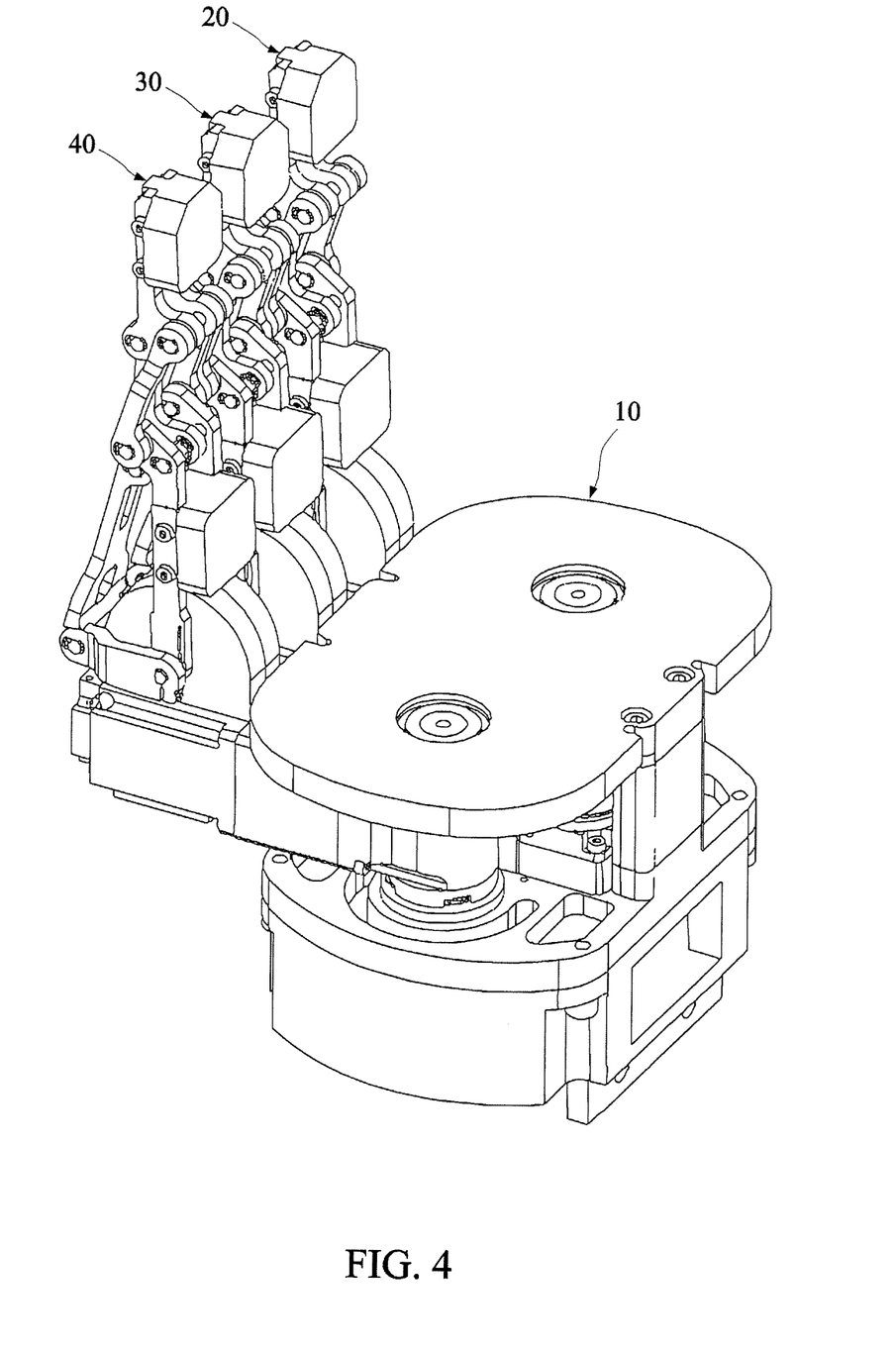
FIG. 4 is a pictorial view showing the gripping device in an opened gripping mode according to the first embodiment of the invention.

FIGS. 1 to 3 are a pictorial view, a front view and a top view showing a gripping device 1 in a closed gripping mode according to the first embodiment of the invention. FIG. 4 is a pictorial view showing the gripping device 1 in an opened gripping mode according to the first embodiment of the invention.

Referring to FIGS. 1 to 4, the gripping device 1 comprises a base 10, a first finger 20 rotatably or movably connected to the base 10 and a second finger 30 connected to the base 10.

The first finger 20 and the second finger 30 are capable of selectively entering the opened gripping mode and the closed gripping mode to grip an object 2. In the closed gripping mode (see FIG. 2), the first and second fingers 20 and 30 grip the object 2 from different sides of the object 2.

In the opened gripping mode (see FIG. 4), the first and second fingers 20 and 30 grip the object 2 from the same side of the object 2.

In order to move or rotate the first finger 20, the gripping device 1 further comprises a first driving module 120. The first driving module 120 is connected to the base 10 and the first finger 20 and drives the first finger 20 to move or rotate relative to the base 10. In this embodiment, the second finger 30 is rotatably or movably connected to the base 10. So, the gripping device 1 further comprises a second driving module 130, which is connected to the base 10 and the second finger 30 and drives the second finger 30 to move or rotate relative to the base 10. However, this does not intend to restrict the invention. In another embodiment, the second finger 30 is fixedly connected to the base 10 because only the rotatable or movable first finger 20 is enough to constitute the opened and closed gripping modes. In still another embodiment, the second finger 30 may be rotated or moved manually. In yet still another embodiment, the first driving module 120 is further connected to the second finger 30 and drives the first finger 20 and the second finger 30 to move or rotate synchronously and reversely relative to the base 10.

As shown in FIG. 1, the gripping device 1 further comprises a third finger 40 connected to the base 10. The first to third fingers 20 to 40 are capable of selectively entering the opened gripping mode and the closed gripping mode to grip the object 2. In addition, each of the first finger 20, the second finger 30 and the third finger 40 has one or multiple joints JT, so that each of the first finger 20, the second finger 30 and the third finger 40 is capable of entering an extension state or a flexion state. However, the invention is not restricted thereto, only one finger having the joint or joints is enough to constitute the opened and closed gripping modes, and only one movable or rotatable finger is enough to implement the invention.

Driving units M20, M30 and M40 drive the first finger 20, the second finger 30 and the third finger 40 by rotating the links of each finger, respectively, so that each finger becomes the extension state or the flexion state. It is to be noted that the fingers may also be presented in other forms and driven to become the extension state or the flexion state by other mechanisms well known in the art.

Figure 5:
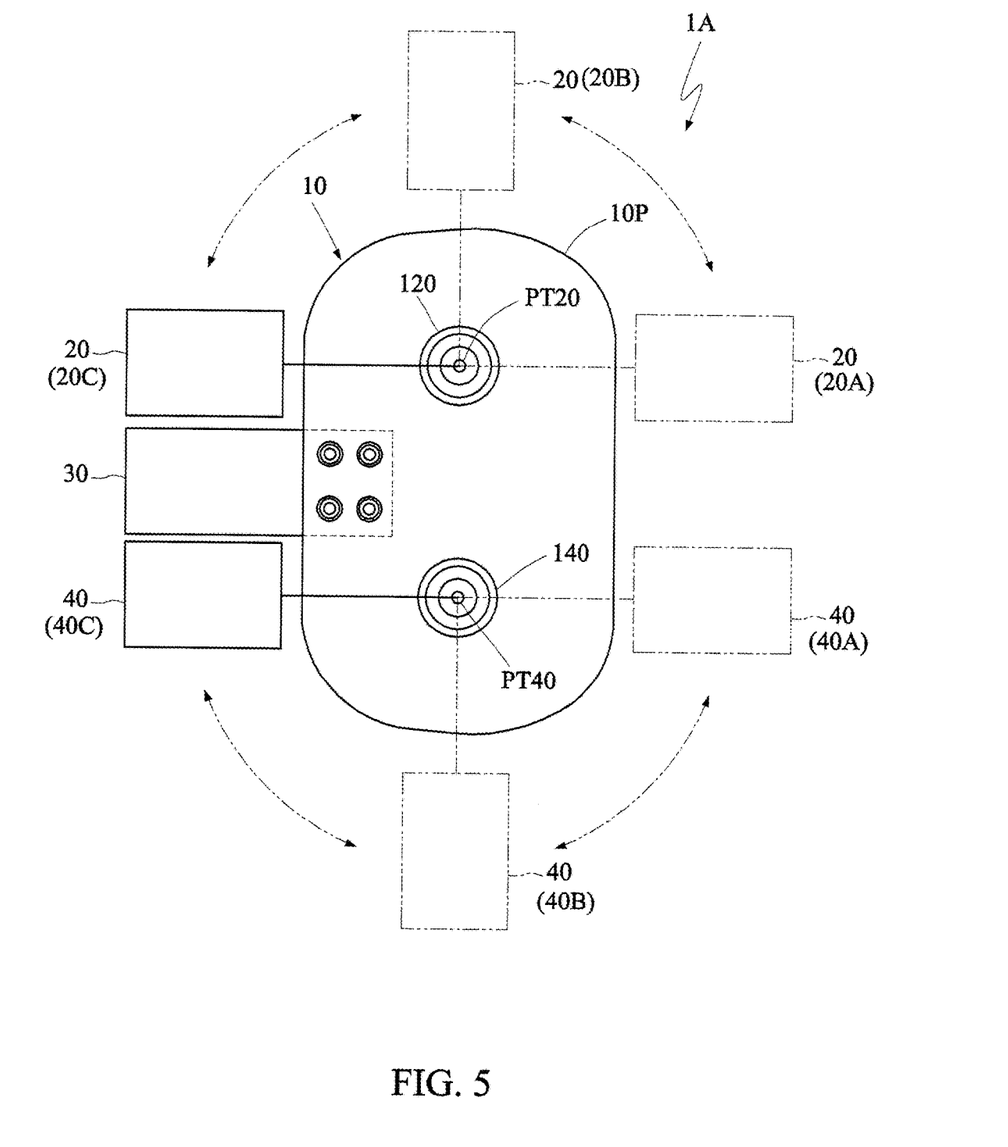
FIGS. 5 to 7 are top views showing first to third modified examples of the gripping device according to the first embodiment of the invention.
Figure 6:
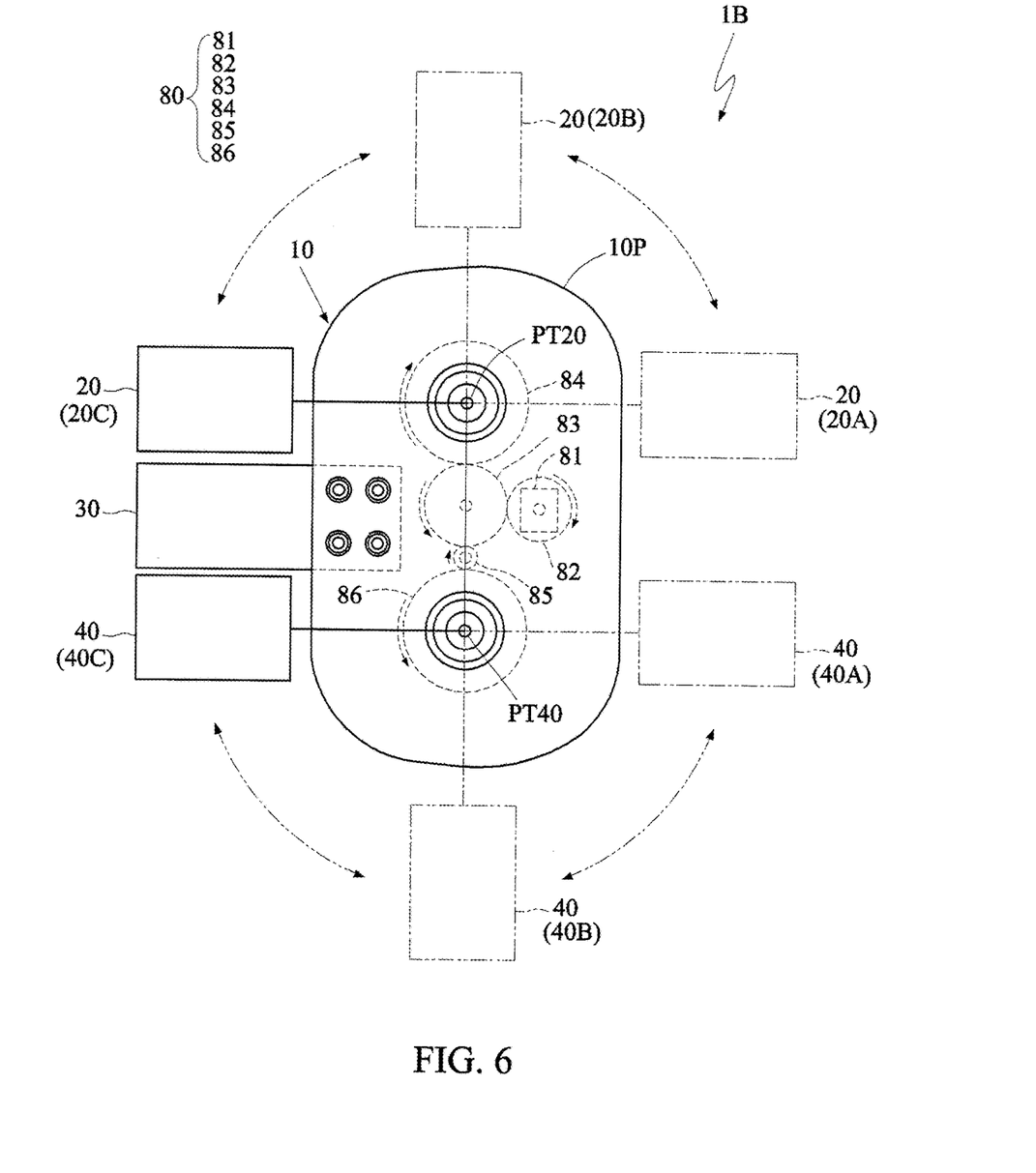
Figure 7:
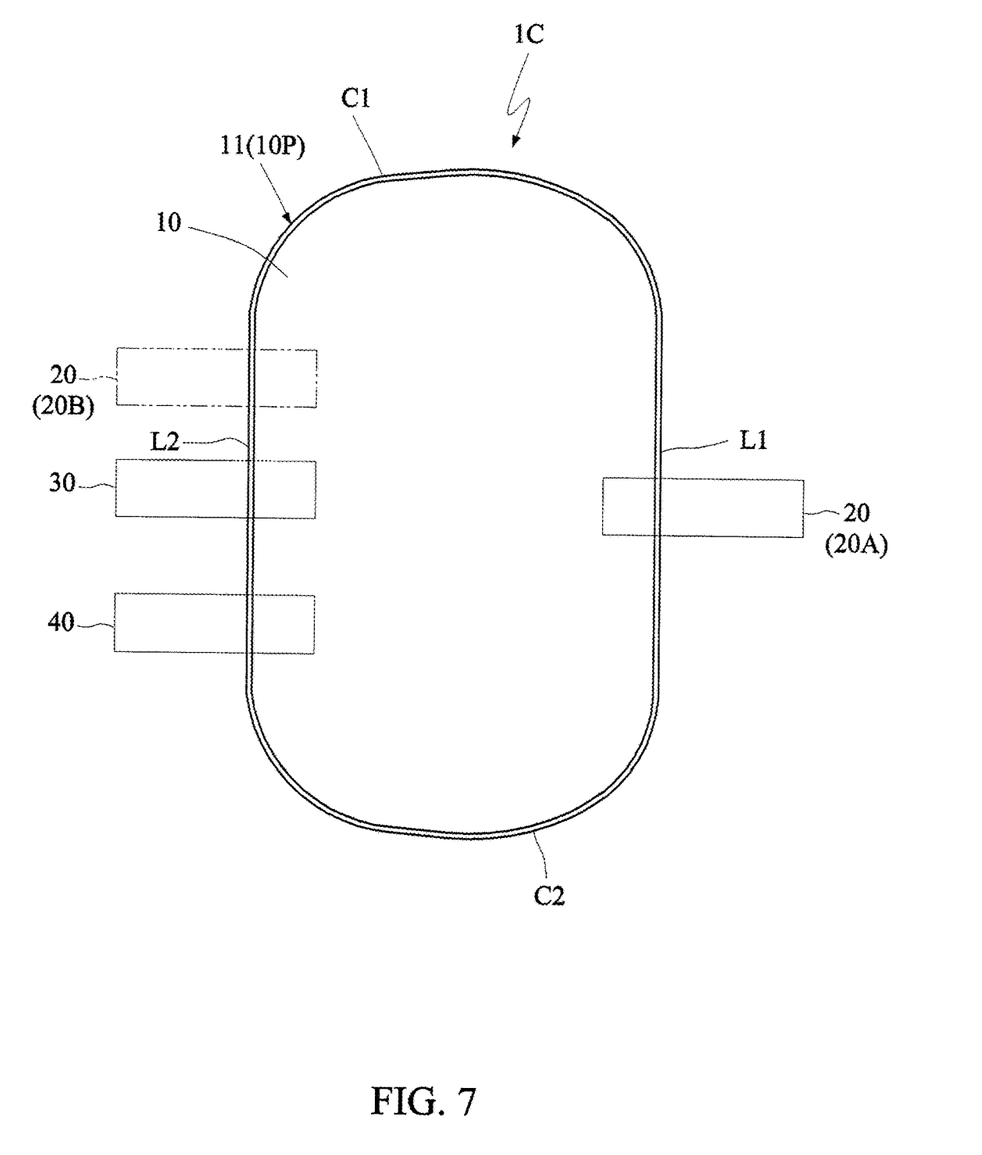

FIGS. 5 to 7 are top views showing first to third modified examples of the gripping devices 1A, 1B and 1C according to the first embodiment of the invention. In order to facilitate the description of the particular examples, the second finger 30 is fixedly connected to the base 10, and the third finger 40 is movably or rotatably connected to the base 10. In the example of FIG. 5, the first driving module 120 is connected to the base 10 and the first finger 20, and drives the first finger 20 to move or rotate relative to the base 10. It is to be noted that the first finger 20 is rotated about the point PT20, and is moved relative to a periphery 10P of the base 10. A third driving module 140 is connected to the base 10 and the third finger 40 and drives the third finger 40 to move or rotate relative to the base 10. It is to be noted that the third finger 40 is rotated about the point PT40, and is moved relative to the periphery 10P of the base 10. Because the first finger 20 and the third finger 40 can be moved independently, the first finger 20 can be located at the position 20A, 20B or 20C or another position while the third finger 40 is located at the position 40A, 40B or 40C or another position. For example, the first finger 20 can be located at the position 20A while the third finger 40 is located at the position 40B when three sides of the object need to be gripped.

In the example of FIG. 6, the gripping device 1B comprises a driving module 80. The driving module 80 is connected to the base 10, the first finger 20 and the third finger 40, and drives the first finger 20 and the third finger 40 to move or rotate synchronously and reversely relative to the base 10. In detail, the driving module 80 comprises a motor 81, a driving gear 82, a middle gear 83, a first gear 84, a second gear 85 and a third gear 86. The motor 81 is connected to the base 10 and the driving gear 82. The middle gear 83 meshes with the driving gear 82. The first gear 84 meshes with the middle gear 83 and is connected to the first finger 20, so that the first finger 20 is rotated with rotation of the first gear 84. The second gear 85 meshes with the middle gear 83. The third gear 86 meshes with the second gear 85 and is connected to the third finger 40, so that the third finger 40 is rotated with rotation of the third gear 86. Thus, the motor 81 can drive the first finger 20 and the third finger 40 to move or rotate synchronously and reversely relative to the base 10. Because the first finger 20 and the third finger 40 are driven synchronously and reversely relative to the base 10, the first finger 20 can be located at the position 20C while the third finger 40 is located at the position 40C; the first finger 20 can be located at the position 20A while the third finger 40 is located at the position 40A; and the first finger 20 can be located at the position 20B while the third finger 40 is located at the position 40B.

Figure 14:
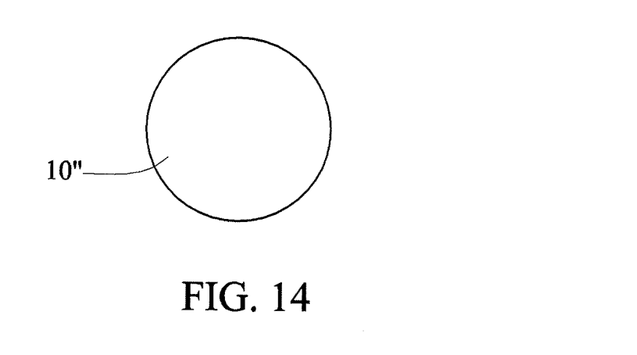
FIGS. 14 and 15 are schematic views showing bases having different shapes.
Figure 15:
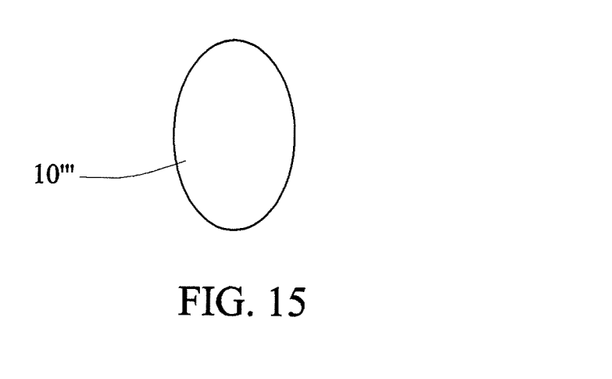

In the example of FIG. 7, only the first finger 20 is movable along a track 11 of the base 10, which is the periphery 10P of the base 10. In another example, at least two of the first finger 20, the second finger 30 and the third finger 40 can be configured to be movable along the track 11. A shape of the periphery 10P of the base 10 is a curved shape composed of two opposite straight lines L1 and L2 and two opposite curves C1 and C2 connected to the straight lines L1 and L2. In another embodiment, the shape of the periphery of the base 10'' is a circular shape (see FIG. 14), or the shape of the periphery of the bases 10''' is an elliptic shape (see FIG. 15). Although the second finger 30 and the third finger 40 are fixedly connected to the base 10, the movable first finger 20 can be moved to the position 20A in the closed gripping mode, and to the position 20B in the opened gripping mode.

Figure 8:
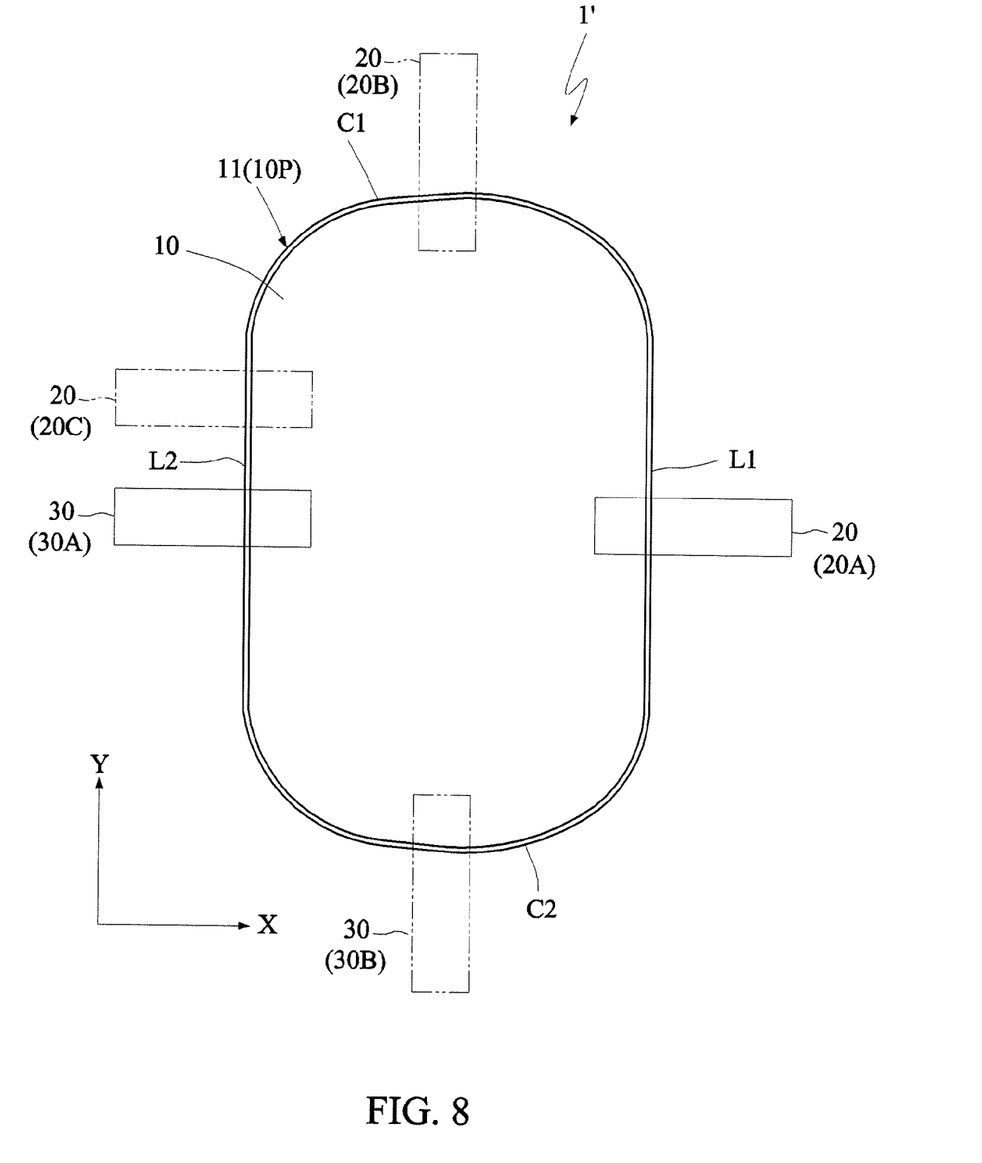
FIG. 8 is a top view showing a gripping device according to a second embodiment of the invention.

FIG. 8 is a top view showing a gripping device 1' according to the second embodiment of the invention. As shown in FIG. 8, the gripping device 1' of the second embodiment is almost the same as the gripping device 1 of FIG. 7 except that only the first finger 20 and the second finger 30 are presented. When the first finger 20 and the second finger 30 are located at the positions 20A and 30A, respectively, the first closed gripping mode is entered. When the first finger 20 and the second finger 30 are located at the positions 20B and 30B, respectively, the second closed gripping mode is entered. When the first finger 20 and the second finger 30 are located at the positions 20C and 30A, respectively, the opened gripping mode is entered. When the gripping device 1' cannot grip the larger object in the first closed gripping mode, the fingers of the gripping device 1' can be switched to the second closed gripping mode because the Y-axis dimension of the base 10 is longer than the X-axis dimension, or switched to the opened gripping mode to grip the larger object.

Figure 9:
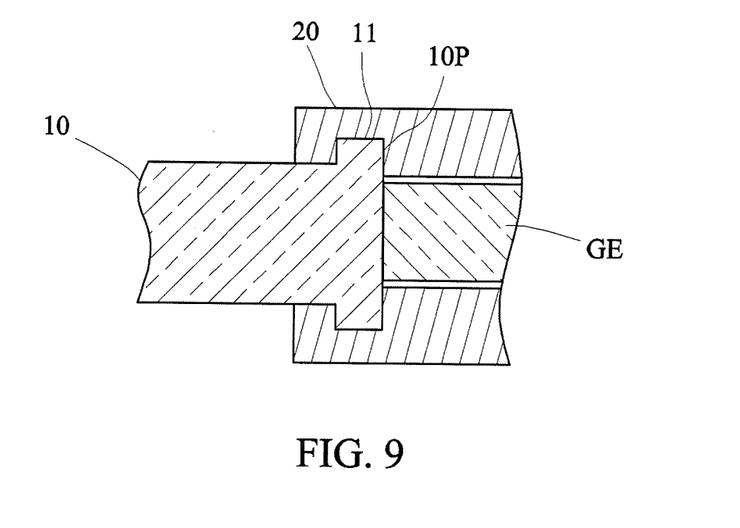
FIG. 9 is a partially cross-sectional view showing the gripping device according to the second embodiment of the invention.

FIG. 9 is a partially cross-sectional view showing the gripping device 1' according to the second embodiment of the invention. Referring to FIG. 9, the periphery 10P of the base 10 may have teeth meshing with a driving gear GE of the first finger 20, so that the first finger 20 can move along the periphery 10P when the driving gear GE rotates, and the first finger 20 is well guided by the track 11 of the base 10.

Figure 10:
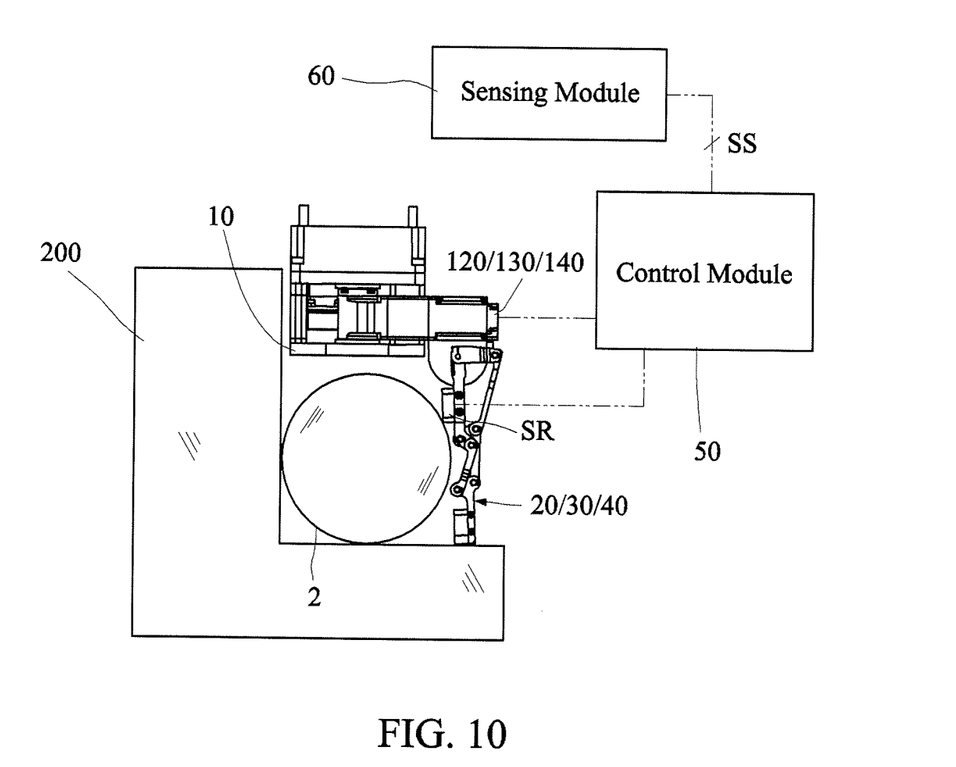
FIG. 10 is a block diagram showing the gripping device according to the invention.

FIG. 10 is a block diagram showing the gripping device 1 according to the invention. In order to determine to enter the opened or closed gripping mode, the gripping device further comprises a control module 50 and a sensing module 60. The control module 50 is electrically connected to the first driving module 120, and may be electrically connected further to the second driving module 130 and the third driving module 140. The sensing module 60 is electrically connected to the control module 50 and senses an obstructer 200 around the object 2 to output a sensing signal SS to the control module 50. Because the object 2 is placed near the obstructer 200, such as a wall, the gripping device 1 in the closed gripping mode cannot grip the object 2, but the gripping device 1 in the opened gripping mode can grip the object 2. In this case, the control module 50 controls the first driving module 120 to move the first finger 20 according to the sensing signal SS, so that the fingers of the gripping device 1 are switched from the closed gripping mode to the opened gripping mode, or switched from the opened gripping mode to the closed gripping mode.

In another embodiment, the sensing module 60 senses a gripping failure of the object 2 to output a sensing signal SS to the control module 50. For example, the sensing module 60 may comprise a camera for capturing the images of the object, and the control module 50 determines whether the object is gripped and moved according to the captured images. If the object is not moved when the gripping device moves, the gripping failure of the object 2 is present. In this case, the control module 50 controls the first driving module 120 to move the first finger 20 according to the sensing signal SS, so that the fingers of the gripping device 1 are switched from the closed gripping mode to the opened gripping mode, or switched from the opened gripping mode to the closed gripping mode.

In still another embodiment, the sensing module 60 senses a size of the object 2 to output a sensing signal SS to the control module 50. For example, the sensing module 60 may capture the images of the object and the fingers, and the control module 50 determines the size of the object according to the image of the object and the finger because the size of the finger is known. In this case, the control module 50 controls the first driving module 120 to move the first finger 20 according to the sensing signal SS, so that the fingers of the gripping device 1 are switched from the closed gripping mode to the opened gripping mode, or switched from the opened gripping mode to the closed gripping mode.

Referring to FIGS. 1 and 10, it is to be noted that the sensors SR attached to the fingers 30, 20 and 40 may also be electrically connected to the control module 50. Each sensor SR senses the pressure on the object, and the control module 50 can control the driving speeds and the driving forces of the driving units M20, M30 and M40 according to the sensed results to prevent the object from being damaged.

Figure 11:
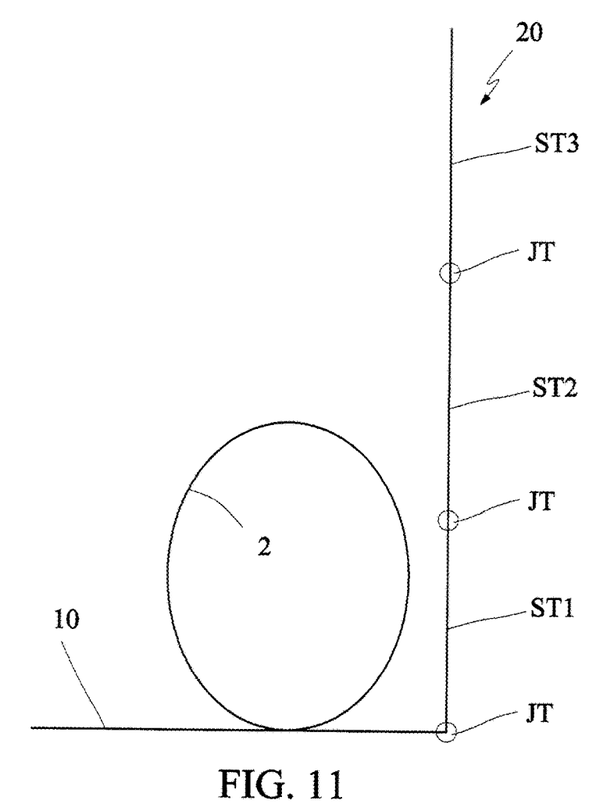
FIGS. 11 and 12 are schematic work views showing the gripping device according to the invention.
Figure 12:
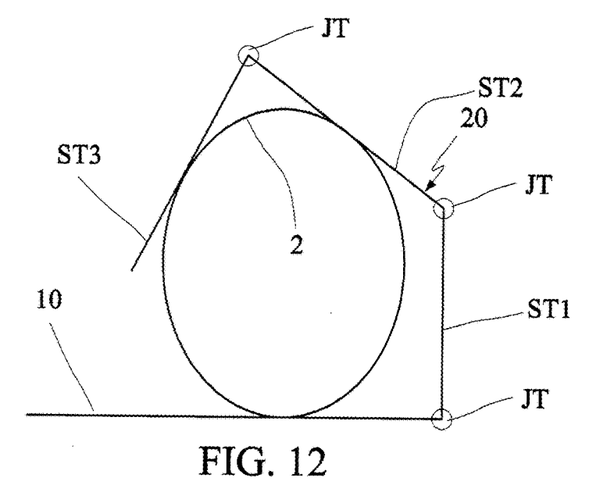

FIGS. 11 and 12 are schematic work views showing the gripping device according to the invention. As shown in FIG. 11, the first finger 20 in the extension state has three segments ST1, ST2 and ST3 joined together and to the base through the joints JT, wherein the segment may be presented in the form of the link. As shown in FIG. 12, the three segments ST1, ST2 and ST3 are driven to make the first finger 20 become the flexion state to grip the object 2. It is to be noted that the base 10 needs not to have an all flat surface contacting with the object 2 because a curved surface of the base 10 contacting with the object 2 is also allowed. In this case, the track may be a three-dimensional track and is not restricted to the two-dimensional track.

Figure 13:
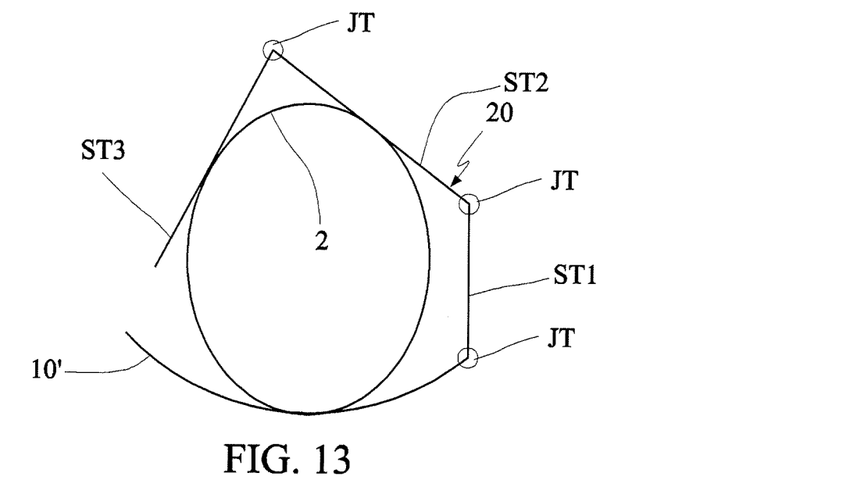
FIG. 13 is a schematic view showing a modified gripping device.

FIG. 13 is a schematic view showing a modified gripping device. As shown in FIG. 13, the modified gripping device is similar to that of FIG. 12 except that the base 10' has the curved surface, which is advantageous to the holding of the curved object.

With the embodiments of the invention, the gripping device can have the opened and closed gripping modes to grip objects having different sizes or located at different environments. In addition, the gripping device with the sensing module and the control module can automatically determine to switch to the opened or closed gripping mode. Thus, an intelligent gripping device for the robot arm can be provided to satisfy the needs of the diversified tasks.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A gripping device, comprising:
   a base;
   a first finger rotatably or movably connected to the base;
   a second finger connected to the base, wherein the first finger and the second finger are capable of selectively entering an opened gripping mode and a closed gripping mode to grip an object, wherein in the opened gripping mode, the first and second fingers grip the object from a same side of the object, and in the closed gripping mode, the first and second fingers grip the object from different sides of the object; and wherein the base has a track, along which the first finger is moved.

2. The gripping device according to claim 1, wherein the second finger is fixedly connected to the base.

3. The gripping device according to claim 1, wherein the second finger is rotatably or movably connected to the base.

4. The gripping device according to claim 3, further comprising:
   a second driving module, which is connected to the base and the second finger and drives the second finger to move or rotate relative to the base.

5. The gripping device according to claim 3, further comprising a first driving module, which is connected to the base, the first finger and the second finger and drives the first finger and the second finger to move or rotate synchronously and reversely relative to the base.

6. The gripping device according to claim 1, further comprising:
   a first driving module, which is connected to the base and the first finger and drives the first finger to move or rotate relative to the base.

7. The gripping device according to claim 6, further comprising:
   a control module, which is electrically connected to the first driving module; and
   a sensing module, which is electrically connected to the control module and senses a gripping failure of the object to output a sensing signal to the control module, wherein the control module controls the first driving module to move the first finger according to the sensing signal, so that the first and second fingers are switched from the closed gripping mode to the opened gripping mode, or switched from the opened gripping mode to the closed gripping mode.

8. The gripping device according to claim 6, further comprising:
a control module electrically connected to the first driving module; and
a sensing module, which is electrically connected to the control module, and senses a size of the object to output a sensing signal to the control module, wherein the control module controls the first driving module to move the first finger according to the sensing signal, so that the first and second fingers are switched from the closed gripping mode to the opened gripping mode, or switched from the opened gripping mode to the closed gripping mode.

9. The gripping device according to claim 6, further comprising:
a control module electrically connected to the first driving module; and
a sensing module, which is electrically connected to the control module and senses an obstructer around the object to output a sensing signal to the control module, wherein the control module controls the first driving module to move the first finger according to the sensing signal, so that the first and second fingers are switched from the closed gripping mode to the opened gripping mode, or switched from the opened gripping mode to the closed gripping mode.

10. The gripping device according to claim 1, wherein each of the first finger and the second finger has a joint or joints, so that each of the first finger and the second finger is capable of entering an extension state or a flexion state.

11. The gripping device according to claim 1, further comprising:
a third finger connected to the base, wherein the first to third fingers are capable of selectively entering the opened gripping mode and the closed gripping mode to grip the object.

12. The gripping device according to claim 11, wherein each of the first finger, the second finger and the third finger has a joint or joints, so that each of the first finger, the second finger and the third finger is capable of entering an extension state or a flexion state.

13. The gripping device according to claim 11, wherein the second finger and the third finger are fixedly connected to the base.

14. The gripping device according to claim 11, wherein the second finger is fixedly connected to the base, and the third finger is movably or rotatably connected to the base.

15. The gripping device according to claim 14, further comprising:
a first driving module, which is connected to the base and the first finger, and drives the first finger to move or rotate relative to the base; and
a third driving module, which is connected to the base and the third finger and drives the third finger to move or rotate relative to the base.

16. The gripping device according to claim 14, further comprising:
a driving module, which is connected to the base, the first finger and the third finger, and drives the first finger and the third finger to move or rotate synchronously and reversely relative to the base.

17. The gripping device according to claim 16, wherein the driving module comprises:
a motor connected to the base;
a driving gear connected to the motor;
a middle gear meshing with the driving gear;
a first gear, which meshes with the middle gear and is connected to the first finger, so that the first finger is rotated with rotation of the first gear;
a second gear meshing with the middle gear; and
a third gear, which meshes with the second gear and is connected to the third finger, so that the third finger is rotated with rotation of the third gear.

18. The gripping device according to claim 1, wherein the track is a periphery of the base.

19. The gripping device according to claim 18, wherein a shape of the periphery of the base comprises:
a circular shape;
an elliptic shape; or
a curved shape composed of two opposite straight lines and two opposite curves connected to the straight lines.

* * * * *